United States Patent [19]

Yoshida et al.

[11] Patent Number: 4,794,557
[45] Date of Patent: Dec. 27, 1988

[54] FLOATING-POINT NORMALIZING CIRCUIT

[75] Inventors: Makoto Yoshida; Tomoji Nukiyama, both of Tokyo, Japan

[73] Assignee: NEC Corporation, Tokyo, Japan

[21] Appl. No.: 946,214

[22] Filed: Dec. 24, 1986

[30] Foreign Application Priority Data

Dec. 24, 1985 [JP] Japan .............................. 60-295107

[51] Int. Cl.$^4$ .............................................. G06F 7/38
[52] U.S. Cl. .............................. 364/748; 364/715.04
[58] Field of Search ................................ 364/748, 715

[56] References Cited

U.S. PATENT DOCUMENTS

4,335,372  6/1982  Aufderheide et al. ............... 364/748
4,553,220  11/1985  Swanson ............................. 364/715
4,586,154  1/1986  Berry ................................. 364/748

Primary Examiner—David H. Malzahn
Attorney, Agent, or Firm—Sughrue, Mion, Zinn, Macpeak & Seas

[57] ABSTRACT

A floating-point normalizing circuit is adapted to receive two multi-bit numbers so as to generate a signal indicative of a shift amount for floating-point normalization. The normalizing comprises a plurality of unitary circuits each including a pair of binary inputs, a unitary shift signal output, a carry input, a carry output internally but disconnectably connected to the carry input. These unitary circuits are adapted to receive at their binary inputs different digit position bits of each of the two input numbers, respectively, but each of the unitary circuits receives at its one pair of binary inputs the same digit position bits of the two input numbers. The carry input of each unitary circuit is connected to the carry output of an adjacent more significant digit unitary circuit so that a carry signal is transferred from a more significant digit unitary circuit to a less significant digit unitary circuit. Each of the unitary circuit generates a unitary shift signal when a predetermined logic level is detected in at least one input of the binary inputs and a predetermined carry signal is received at its carry input, and also disconnects the internal connection between the carry input and output, whereby the position of the unitary circuit generating the unitary shift signal is indicative of the amount of required shift for normalization.

26 Claims, 3 Drawing Sheets

FIGURE 1

PRIOR ART

FLOATING-POINT NORMALIZING CIRCUIT

BACKGROUND OF THE INVENTION

1. Field of the Invention

The present invention relates to a high-speed floating-point normalizing circuit which can be easily incorporated in an integrated circuit.

2. Description of Related Art

Figure 1:
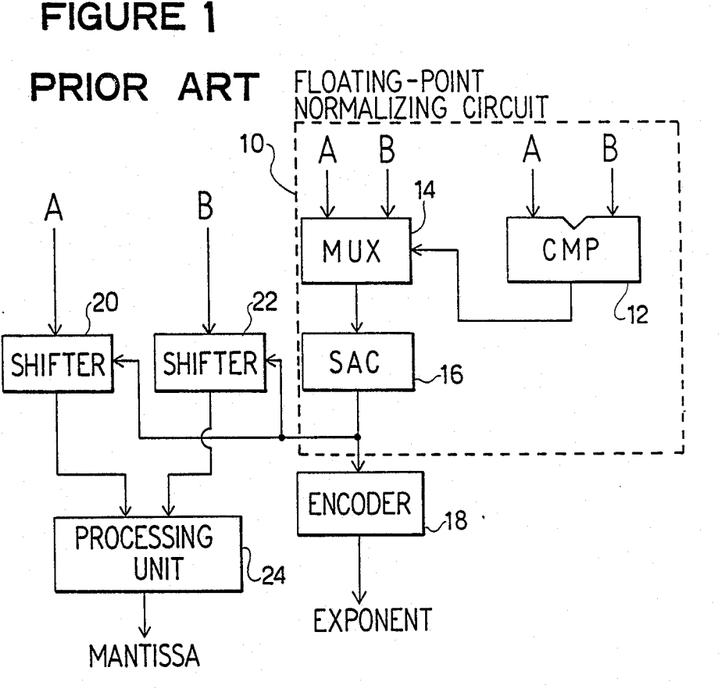
FIG. 1 is a block diagram of the conventional floating-point arithmetic circuit.

In general, a floating-point arithmetic operation needs a floating-point normalization. FIG. 1 shows one example of the conventional floating-point arithmetic circuit which has a floating-point normalizing circuit. As shown in FIG. 1, the floating-point normalizing circuit 10 includes a comparator (CMP) 12 receiving two multi-bit numbers A and B to determine which is larger, A or B. This comparator 12 controls a multiplexer (MUX) 14 which also receives the two input numbers A and B, so that the multiplexor 14 outputs a larger one of the two input numbers to a shift and count circuit (SAC) 16. This SAC circuit 16 leftwardly shifts the input number until the shifted number has a nonzero leftmost digit, i.e., "1" at the most significant digit, and at the same time the SAC circuit 16 counts the amount of the shift, Thus, the SAC circuit 16 outputs the result of the count to an encoder 18, which is in turn converts the counted value into an exponent data in a floating-point representation. Further, the output of the SAC circuit 16 is supplied to a pair of shifters 20 and 22 which receive the input numbers A and B, respectively, so that the respective shifters shift the respective input numbers the same amount indicated by the SAC circuit 16. The two numbers A and B thus shifted are outputted from the respective shifters 20 and 22 to a processing unit 24, which in turn executes a designated arithmetic operation to the two input numbers so as to output the result of the arithmetic operation as a fraction or mantissa in a floating-point representation.

As seen from the above, the conventional floating-point normalizing circuit includes three different circuits, i.e., the comparator, the multiplexor and the shift and count circuit, and therefore, the normalizing circuit is inevitably complicated. In addition, the normalizing output is generated through the three sequential steps, i.e., the comparison, the selection and the shift, and so, the operation speed is not so fast. Therefore, the conventional floating-point normalizing circuit is not suitable for a high speed operation circuit in the form of an integrated circuit.

SUMMARY OF THE INVENTION

Accordingly, it is an object of the present invention to provide a floating-point normalizing circuit which has dissolved the aforementioned drawbacks of the conventional one.

Another object of the present invention is to provide a floating-point normalizing circuit of a simple structure which can operate at a high speed.

Still another object of the present invention is to provide a floating-point normalizing circuit including only circuits of the same structure, so that the normalizing circuit can be easily assembled in an integrated circuit.

A further object of the present invention is to provide a floating-point normalizing circuit consisting of only the same structure circuits arranged to receive the multi-bit number in parallel, so that the normalizing circuit can operate at a high speed.

A still further object of the present invention is to provide a floating-point arithmetic circuit incorporating such a floating-point normalizing circuit.

The above and other objects of the present invention are achieved in accordance with the present invention by a floating-point normalizing circuit adapted to receive two multi-bit numbers so as to generate a signal indicative of a shift amount for floating-point normalization, comprising a plurality of unitary circuits each including a pair of binary inputs, a unitary shift signal output, a carry input, and a carry output internally and disconnectably connected to the carry input, the unitary circuits being adapted to receive at their binary inputs different digit position bits of each of the two input numbers, respectively, but each of the unitary circuits receiving at its one pair of binary inputs the same digit position bits of the two input numbers, the carry input of each unitary circuit being connected to the carry output of an adjacent significant digit unitary circuit so that a carry signal is transferred from a more significant digit unitary circuit to a less significant digit unitary circuit, each of the unitary circuit functioning to disconnect the internal connection between the carry input and output and to generate a unitary shift signal when a predetermined logic level is detected in at least one input of the binary inputs and a predetermined carry signal is received at its carry input, whereby the position of the unitary circuit generating the unitary shift signal is indicative of the amount of required shift for normalization.

In one embodiment, each of the unitary circuits is adapted to generate a signal indicative of the comparison result of a pair of bits inputted to its binary inputs, and the normalizing circuit further includes a logic circuit receiving the comparison signals from the respective unitary circuits so as to generate a general comparison signal indicating which of the two numbers is large.

Further, each of the unitary circuits includes a transfer gate connected between the carry input and the carry output, and comparison means connected to the carry input and one of the binary inputs to control the transfer gate and to generate the unitary shift signal in accordance with a logical relation between the carry input and the one binary input.

Specifically, the comparison means includes an NAND gate having a first input connected to the carry input and a second input connected to receive the one binary input. An output of the NAND gate is connected to a control input of the transfer gate. In one embodiment, the other input of the NAND gate is directly connected to the one binary input. Alternatively, each unitary circuit includes an OR gate having two inputs connected to the pair of binary inputs, respectively, and the other input of the NAND gate is connected to an output of the OR gate.

The comparison means also includes an inverter connected at its input to the output of the NAND gate and at its output to the unitary shift signal output. The comparison means also includes a switching transistor connected between the carry output and ground and controlled by the output of the inverter.

In a preferred embodiment, each of the unitary circuit further includes a second comparison means receiving any one of the two binary inputs and a signal introduced from the carry input so as to generate a comparison output indicating which of the two binary input is large. In one embodiment, the second comparison means includes a NOR gate having a first input connected to any one of the two binary inputs and a second input connected to the output of the first comparison means, so that the NOR gate generates the comparison output from its output terminal. In another embodiment, the second comparison means includes an AND gate having a first input connected to any one of the two binary inputs and second input connected directly to the carry input, so that the AND gate generates the comparison output from its output terminal.

According to another aspect of the present ivnention there is provided a floating-point arithmetic circuit adapted to receive at least two multi-bit numbers, which includes a normalizing circuit receiving the two multi-bit numbers to generate a shift amount signal, a pair of shifters receiving the two multi-bit numbers, respectively, to shift the respective input numbers in accordance with the shift amount signal, a processing unit reeeiving the outputs of the pair of shifters to carry out a predetermined arithmetic operation to the inputted numbers and to output the result of operation in the form of a mantissa, and an encoder receiving the shift amount signal to generate an exponent part for the above mentioned arithmetic operation. The normalizing caircuit comprises a plurality of unitary circuits each including a pair of binary inputs, a unitary shift signal output, a carry input, and a carry output internally and disconnectably connected to the carry input. The unitary circuits are adapted to receive at their binary inputs different digit position bits of each of the two input numbers, respectively, but each of the unitary circuits receives at its one pair of binary inputs the same digit position bits of the two input numbers. The carry input of each unitary circuit is connected to the carry output of an adjacent more significant digit unitary circuit so that a carry signal is transferred from a more significant digit unitary circuit to a less significant digit unitary circuit. Each of the unitary circuit functions to disconnect the internal connection between the carry input and output and to generate a unitary shift signal when a predetermined logic level is detected in at least one input of the binary inputs and a predetermined carry signal is received at its carry input, whereby the position of the unitary circuit generating the unitary shift signal is indicative of the amount of required shift for normalization.

The above and other objects, features and advantages of the present invention will be apparent from the following description of preferred embodiments of the invention with reference to the accompanying drawings.

DESCRIPTION OF THE PREFERRED EMBODIMENTS

Figure 2:
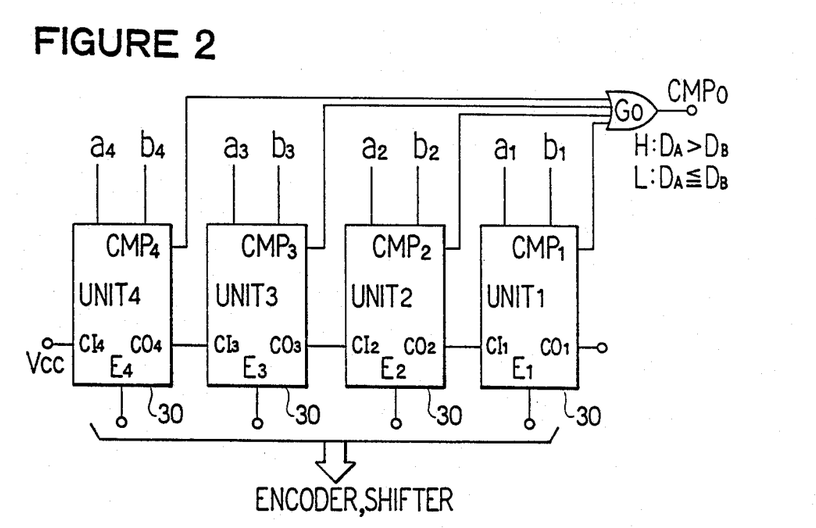
FIG. 2 is a block diagram of one embodiment of the floating-point normalizing circuit in accordance with the present invention.

Referring to FIG. 2, the floating-point normalizing circuit for two four-bit numbers, which embodies the present invention, comprises four unitary circuits 30 arranged to in parallel receive two four-bit numbers A and B which can be expressed as follows:

$$A = a_4 \times 2^3 + a_3 \times 2^2 + a_2 \times 2^1 + a_1$$

$$B = b_4 \times 2^3 + b_3 \times 2^2 + b_2 \times 2^1 + b_1$$

The shown normalizing circuit detects the most significant digit of "1" in the input two four-bit numbers A and B, and compares the effective digit numbers of the two input numbers to each other. For this purpose, the unitary circuit 30 receive diffornt digits of each of the input numbers A and B, respectively, and each of the unitary circuits 30 receives the same digit ($a_4$ and $b_4$, $a_3$ and $b_3$, $a_2$ and $b_2$, and $a_1$ and $b_1$) of the input numbers A and B. Further, each of unitary circuits 30 includes a carry input $CI_i$ receiving a carry signal from an adjacent unitary circuit of more significant digit. But, the most significant digit (leftmost) circuit 30 receives at its carry input $CI_4$ a reference voltage Vcc indicative of the logical value "1". Also, each unitary circuit has a carry output $CO_i$ connected to the carry input of an adjacent less significant digit unitary circuit. Further, each unitary circuit has a unitary comparison output $CMP_i$ and a unitary shift output $E_i$.

With this arrangement, the carry signal of "1" is transferred to the most significant digit unitary circuit UNIT 4 towards the least significant digit unitary circuit UNIT 1, and in the course of the transmission of the carry signal, the most significant digit unitary circuit of unitary circuits receiving a nonzero binary signal, generates a unitary shift signal $E_i$ and at the same time changes the carry signal from "1" to "0", so that, less significant digit unitary circuits receiving a nonzero binary signal will not generate a unitary shift signal $E_i$. Thus, the position of the unitary circuit generating the unitary shift signal is indicative of the amount of required shift for normalization. Therefore, the unitary comparison outputs $CMP_i$ of all the unitary circuits 30 are fed to an OR gate $G_o$, which in turn outputs a general comparison output $CMP_0$ indicating the result of the comparison of the effective digit numbers $D_A$ and $D_B$ of the input numbers A and B. Further, only the unitary circuit generating the unitary shift signal, also generates a unitary comparison signal $CMP_i$ indicating which of the two binary inputs $a_i$ and $b_i$ is large. Thus, the unitary shift outputs $E_i$ of all the unitary circuits 30 are supplied as the shift amount data to the encoder 18 and the shifters 20 and 22 as shown in FIG. 1.

Figure 3:
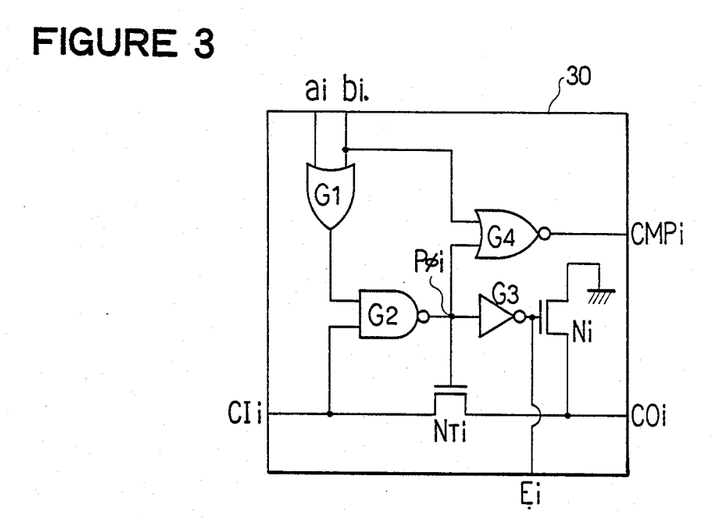
FIG. 3 is a circuit diagram of a unitary circuit which can be used in the floating-point normalizing circuit shown in FIG. 2.

Turning to FIG. 3, there is shown one example of the unitary circuit 30. The circuit 30 includes an OR gate $G_1$ receiving the bits $a_i$ and $b_i$ at the same digit position of the input numbers A and B. An output of the OR gate $G_1$ is connected to one input of a NAND gate $G_2$ whose other input is connected to a carry input $CI_i$. The NAND gate $G_2$ is connected at its output through a node $P\phi_i$ to a gate electrode of a transfer gate transistor $N_{Ti}$ connected between the carry input $CI_i$ and a carry output $CO_i$. Further, the output of the NAND gate $G_2$ is connected to an input of an inverter $G_3$, whose output is connected to a unitary shift output $E_1$ and a gate electrode of a switching transistor $N_i$. This transistor $N_i$ is connected between the carry output $CO_i$ and ground. In addition, the output of the NAND gate $G_2$ is connected to one input of a NOR gate $G_4$, which is connected at its other input to the binary input $b_i$. An output of the NOR gate $G_4$ is connected to a unitary comparison output $CMP_i$.

Next, operation will be explained with reference to an exemplary case of $A=0101$ and $B=0011$.

Namely, the most significant digit unitary circuit UNIT 4 receives $a_4$ of "0" $b_4$ of "0". Therefore, the OR gate $G_1$ outputs the logic "0". On the other hand, since the carry input $CI_4$ is clamped to the logic "1" (i.e., Vcc), the output of the NAND gate $G_2$, i.e., the node $P\phi_4$ is brought to the logic "1". Therefore, the transfer gate $N_{Ti}$ is put in an ON condition, and so, the potential at the carry input $CI_4$ is transferred to the carry output $CO_4$. Namely, the carry output $CO_4$ is put at the logic "1".

Further, since the node $P\phi_4$ is at the logic "1", the inverter $G_3$ outputs the logic "0", and therefore, the transistor $N_4$ is maintained off. Accordingly, the shift output $E_4$ is at the logic "0". In addition, since the binary input $b_4$ is at the logic "0" and the node $P\phi_4$ is at the logic "1", the NOR gate $G_4$ outputs the comparison output $CMP_4$ of "0".

The next more significant digit unitary circuit UNIT 3 receives $a_3$ of "1", $b_3$ of "0" and $CI_3$ (=$CO_4$) of "1". Therefore, the OR gate $G_1$ outputs the logic "1", and so, the NAND gate $G_2$ generates the logic "0" at the node $P\phi_3$. Accordingly, the transfer gate $N_{Ti}$ is turned off, and the inverter $G_3$ outputs the logic "1" as the shift output $E_3$, so that the transistor $N_3$ is turned on so as to generate the carry output $CO_3$ of "0". On the other hand since the NOR gate $G_4$ receives the binary input $b_3$ of "0" and the node signal $P\phi_3$ of "0", it generates the comparison output $CMP_3$ of "1". Thus, the OR gate $G_o$ generates the general comparison output $CMP_0$ of "1" which means $D_A>D_B$.

The third more significant digit unitary circuit UNIT 2 receives $a_2$ of "0", $b_2$ of "1" and $CI_2$ (=$CO_3$) of "0". Since $CI_2$="0", the NAND gate $G_2$ generates the logic "1" at the node $P\phi_2$, and so, the transfer gate $N_{T2}$ is put ON, so that the $CI_2$ of "0" is transferred to the carry output $CO_2$. In addition, the inverter $G_3$ generates the shift output $E_2$ of "0", and the NOR gate $G_4$ produces the comparison output $CMP_2$ of "0".

The least significant digit unitary circuit UNIT 1 receives $a_1$ of "1" and $b_1$ of "1". But, since the carry input $CI_1$ is at the logic "0", the carry output $CO_1$, the comparison output $CMP_1$ and the shift output $E_1$ are brought into the logic "0", similarly to the case of UNIT 2.

Namely, the result is $E=0100$, and $CMP_0=1$ indicating $A>D$ ($D_A>D_B$).

The following Table I shows the logical relation as mentioned above.

TABLE I

| Point | bit No. | | | |
|---|---|---|---|---|
| | 4 | 3 | 2 | 1 |
| $a_i$ | 0 | 1 | 0 | 1 |
| $b_i$ | 0 | 0 | 1 | 1 |
| $CI_i$ | 1 | 1 | 0 | 0 |
| $CO_i$ | 1 | 0 | 0 | 0 |
| $E_i$ | 0 | 1 | 0 | 0 |
| $P\phi_i$ | 1 | 0 | 1 | 1 |
| $CMP_i$ | 0 | 1 | 0 | 0 |

As seen from the above, since the carry input $CI_4$ of the most significant digit (leftmost) unitary circuit UNIT 4 is clamped to the logic "1", the carry signal of "1" is transferred downwardly to a unitary circuit which receives the logic "1" at either or both of the binary inputs $a_i$ and $b_i$, which unitary circuit will then outputs the carry output $CO_i$ of "0". This carry signal of "0" is transferred to the least significant digit (rightmost) unitary circuit UNIT 1. At this time, only the above mentioned unitary circuit which has received the logic "1" at its binary inputs, generates the shift output $E_i$ of "1", and therefore, the position of the shift output "1" indicates the necessary amount of shift for normalization.

Furthermore, when the carry input $CI_i$ is at the logic "1", the unitary circuit generates the comparison output $CMP_i$ of "1" if $a_i=1$ and $b_i=0$. Otherwise, the $CMP_i$ of "0" is outputted. Therefore, the general comparison output $CMP_o$ of "1" (i.e., a high logical level) indicates $D_A>D_B$, and $CMP_0$ of "0" (i.e., a low logical level) means $D_A \leq D_B$.

Further, with connection between the carry output $CO_i$ and the carry input $CO_{i-1}$ in each pair of adjacent unitary circuits, the logic "1" is transferred from the most significant digit unitary unit toward a less significant digit unitary circuit. In the course of the carry signal transmission, the carry signal "1" is changed to "0" in the most significant digit unitary circuit of the unitary circuits that detect the binary value of "1" at the binary inputs $a_i$ and $b_i$. Therefore, the NOR gate $G_4$ which receives the binary input $b_i$ and the output of the NAND gate $G_2$ (the node $P\phi_i$), will generate a signal indicative of whether or not the logic "1" appears only the input $a_i$ of the unitary circuit in which the carry signal is changed from "1" to "0". Accordingly, if another NOR gate is provided to receive the binary input $a_i$ and the signal of the node $P_{0i}$, the additional gate will generate a signal indicating whether or not the logic "1" appears only the input "$b_i$". If such a signal is compared with the $CMP_i$, it is possible to discriminate three conditions $D_A>D_B$, $D_A=D_B$ and $D_A<D_B$.

Figure 4:
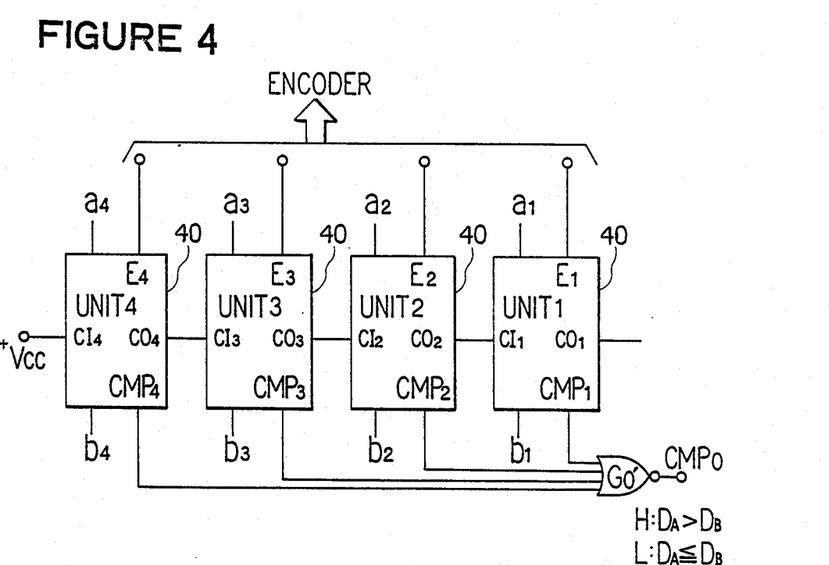
FIG. 4 is a diagram similar to FIG. 2 but showing another embodiment of the normalizing circuit.
Figure 5:
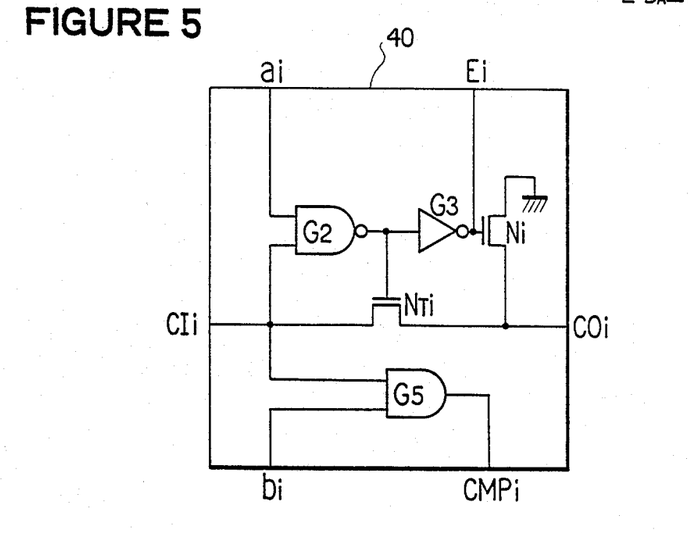
FIG. 5 is a diagram similar to FIG. 3 but showing another embodiment of the unitary circuit which can be used in the normalizing circuit shown in FIG. 4.

Referring to FIG. 4, there is shown a modification of the normalizing circuit, which comprises four unitary circuits 40 as shown in FIG. 5. In the unitary circuit 40, the binary input $a_i$ is directly connected to the one input of the NAND gate $G_2$, and in place of the OR gate $G_1$ and the NOR gate $G_4$, an AND gate $G_5$ is provided to receive the carry input $CI_i$ and the binary input $b_i$ and to output the comparison output $CMP_i$.

As seen from the above, the circuit of FIG. 5 is adapted to detect the binary value "1" of only the input $a_i$, i.e., only the input number A.

Next, operation of the normalizing circuit shown in FIG. 4 will be explained with reference to the above mentioned exemplary case of $A=0101$ and $B=0011$.

Namely, the most significant digit unitary circuit UNIT 4 receives $a_4$ of "0" $b_4$ of "0". On the other hand, the carry input $CI_4$ is clamped to the logic "1". Therefore, the NAND gate $G_2$ outputs a signal of the logic "1". Therefore, the transfer gate $N_{Ti}$ is put in an ON condition, and so, the carry signal of "1" is transferred from the carry input $CI_4$ to the carry output $CO_4$.

Further, since the output of the NAND gate $G_2$ is at the logic "1", the inverter $G_3$ outputs the logic "0", and therefore, the transistor $N_4$ is maintained off, so that the shift output $E_4$ is at the logic "0". In addition, since the binary input $b_4$ is at the logic "0" and the carry input $CI_i$ is at the logic "1", the AND gate $G_5$ outputs the comparison output $CMP_4$ of "0".

The next more significant digit unitary circuit UNIT 3 receives $a_3$ of "1", $b_3$ of "0" and $CI_3$ ($=CO_4$) of "1". Therefore, the NAND gate $G_2$ generates the logic "0". Accordingly, the transfer gate $N_{T3}$ is turned off, and the inverter $G_3$ outputs the shift output $E_3$ of the logic "1", so that the transistor $N_3$ is turned on so as to generate the carry output $CO_3$ of "0". On the other hand, since the AND gate $G_5$ receives the binary input $b_3$ of "0" and the carry input signal $CI_3$ of "0", it generates the comparison output $CMP_3$ of "0".

The third more significant digit unitary circuit UNIT 2 receives $a_2$ of "0", $b_2$ of "1" and $CI_2$ ($=CO_3$) of "0". Since $CI_2$="0", the AND gate $G_5$ produces the comparison output $CMP_2$ of "0", and the NAND gate $G_2$ generates the logic "1", and so, the transfer gate $N_{T2}$ is put ON, so that the $CI_2$ of "0" is transferred to the carry output $CO_2$. In addition, the inverter $G_3$ generates the shift output $E_2$ of "0".

The least significant digit unitary circuit UNIT 1 receives $a_1$ of "1" and $b_1$ of "1". But, since the carry signal applied to $CI_1$ is already at the logic "0", the carry output $CO_1$, the comparison output $CMP_1$ and the shift output $E_1$ are brought into the logic "0", similarly to the case of UNIT 2.

Namely, the result of E=0100, and the NOR gate $G_0'$ outputs $CMP_0$ of "1".

The following Table II shows the logical relation as mentioned above.

TABLE II

| Point | bit No. | | | |
|---|---|---|---|---|
| | 4 | 3 | 2 | 1 |
| $a_i$ | 0 | 1 | 0 | 1 |
| $b_i$ | 0 | 0 | 1 | 1 |
| $CI_i$ | 1 | 1 | 0 | 0 |
| $CO_i$ | 1 | 0 | 0 | 0 |
| $E_i$ | 0 | 1 | 0 | 0 |
| $CMP_i$ | 0 | 0 | 0 | 0 |

As seen from the above, since the carry input $CI_4$ of the most significant digit (leftmost) unitary circuit UNIT 4 is clamped to the logic "1", the carry signl of "1" is transferred downwardly to a unitary circuit which receives the logic "1" at the binary inputs $a_i$, which unitary circuit will then outputs the carry output $CO_i$ of "0". This carry signal of "0" is transferred through an adjacent less significant digit unitary circuit to the least significant digit (rightmost) unitary circuit UNIT 1. At this time, only the above mentioned unitary circuit which has received the logic "1" at its binary input $a_i$, generates the shift output $E_i$ of "1", and therefore, the position of the shift output $E_i$ of "1" indicates the necessary amount of shift for normalization.

As seen from the above, since the circuit of FIG. 5 detects only the binary input $a_i$ to control the transmission of the carry signal, the logical product of the carry signal $CI_i$ and the other binary input $b_i$ is obtained by the AND gate $G_5$ to compare the digit numbers of the numbers A and B. The AND gate $G_5$ operates to consequently detect the condition $D_A \leq D_B$, differently from the first embodiment. Accordingly, the outputs $CMP_i$ are inputted to the NOR gate $G_0'$, which generates the signal of "1" under the condition $D_A > D_B$ and "0" under the condition $D_A \leq D_B$, similarly to the first embodiment.

The invention has thus been shown and described with reference to specific embodiments. However, it should be noted that the invention is in no way limited to the details of the illustrated structures but changes and modifications may be made within the scope of the appended claims.

We claim:

1. A floating-point normalizing circuit adapted to received first and second multi-bit numbers so as to generate a signal indicative of a shift amount for floating-point normalization, comprising a plurality of unitary circuits each including a pair of binary inputs, a unitary shift signal output, a carry input, and a carry output internally connected through a controlled gate means to the carry input, the unitary circuits being adapted to receive at their binary inputs different digit positions bits of each of the first and second input numbers, respectively, but each of the unitary circuits receiving at its one pair of binary inputs the same digit position bits of the first and second input numbers, the carry input of each of the second most significant digit unitary circuit to the second least significant digit unitary circuit being connected to the carry output of an adjacent more significant digit unitary circuit so that a carry signal is transferred from the most significant digit unitary circuit toward the least significant digit unitary circuit, each of the unitary circuit functioning to turn off the controlled gate means and to generate a unitary shift signal when a predetermined logic level is detected in at least one input of the binary inputs and a predetermined carry signal is received at its carry input, whereby the position of the unitary circuit generating the unitary shift signal is indicative of the amount of required shift for normalization.

2. A circuit claimed in claim 1 wherein each of the unitary circuits generates a signal indicative of the comparison result of a pair of bits inputted to its binary inputs as a function of the carry input, and wherein the normalizing circuit further includes a logic circuit receiving the comparison signals from the respective unitary circuits so as to generate a general comparison signal indicating whether or not the first number is larger than the second number.

3. A circuit claimed in claim 1 wherein the control gate means includes a transfer gate connected between the carry input and the carry output and each of the unitary circuits further includes comparison means connected to receive the carry input and at least one of the binary inputs so as to control the transfer gate and to generate the unitary shift signal in accordance with a logical relation between the carry input and the at least one binary input.

4. A circuit claimed in claim 3 wherein the comparison means includes an NAND gate having a first input connected to the carry input and a second input connected to receive the at least one binary input, an output of the NAND gate being connected to a control input of the transfer gate.

5. A circuit claimed in claim 4 wherein the second input of the NAND gate is directly connected to the at least one binary input.

6. A circuit claimed in claim 4 wherein each unitary circuit further includes an OR gate having two inputs connected to the pair of binary inputs, respectively, and the second input of the NAND gate is connected to an output of the OR gate.

7. A circuit claimed in claim 4 wherein the comparison means also includes an inverter connected at its input to the output of the NAND gate and at its output to the unitary shift signal output.

8. A circuit claimed in claim 7 further including a switching transistor connected between the carry output and ground and controlled by the output of the inverter.

9. A circuit claimed in claim 4 wherein each of the unitary circuit further includes a second comparison means connected to receive one of the two binary inputs and a signal introduced from the carry input so as to generate a comparison output indicating which of the two binary input is larger.

10. A circuit claimed in claim 4 wherein each of the unitary circuit further includes a NOR gate having a first input connected to any one of the two binary inputs and a second input connected to the output of the NAND gate, the NOR gate generating a comparison output indicating which of the two binary inputs is larger.

11. A circuit claimed in claim 4, wherein each of the unitary circuit further includes an AND gate having a first input connected to any one of the two binary inputs and second input connected directly to the carry input, the AND gate generating a comparison output indicating which of the two binary inputs is larger.

12. A circuit claimed in claim 1 wherein the carry input of the first most significant digit unitary circuit is connected to receive a predetermined carry signal and the carry output of the first most significant digit unitary circuit is connected to the carry input of the second most significant digit unitary circuit, and wherein the carry output of the second least significant digit unitary circuit is connected to the carry input of the first least significant digit unitary circuit.

13. A circuit claimed in claim 1 wherein each of the unitary circuits has a first means coupled to the carry input and at least one of the pair of binary inputs of the unitary circuit for generating a control signal when the carry input and the at least one binary input assume predetermined logic levels, respectively, a second means responding to the control signals so as to turn off the controlled gate means so that the carry input is separated from the carry output, and a third means responding to the control signal so as to generate the unitary shift signal to the unitary shift signal output of the unitary circuit.

14. A floating-point arithmetic circuit adapted to receive at least two multi-bit numbers, which includes a normalizing circuit receiving the two multi-bit numbers to generate a shift amount signal, a pair of shifters receiving the two multi-bit numbers, respectively, to shift the respective input numbers in accordance with the shift amount signal, a processing unit receiving the outputs of the pair of shifters to carry out a predetermined arithmetic operation between the inputted numbers and to output the result of operation in the form of a mantissa, and an encoder receiving the shift amount signal to generate an exponent part for the above mentioned arithmetic operation, wherein the improvement is that the normalizing circuit comprises a plurality of unitary circuits each including a pair of binary inputs, a unitary shift signal output, a carry input, and a carry output internally connected through a controlled gate means to the carry input, the unitary circuits being adapted to receive at their binary inputs different digit position bits of each of the two input numbers, respectively, but each of the unitary circuits receiving at its one pair of binary inputs the same digit position bits of the two input numbers, the carry input of each unitary circuit being connected to the carry output of an adjacent more significant digit unitary circuit so that a carry signal is transferred from the most significant digit unitary circuit to the least significant digit unitary circuit, each of the unitary circuit functioning to turn off the controlled gate means and to generate a unitary shift signal when a predetermined logic level is detected in at least one input of the binary inputs and a predetermined carry signal is received at its carry input, whereby the position of the circuit generating the unitary shift signal is indicative of the amount of required shift for normalization.

15. A circuit claimed in claim 14 wherein each of the unitary circuits generates a signal indicative of the comparison result of a pair of bits inputted to its binary inputs as a function of the carry input, and wherein the normalizing circuit further includes a logic circuit receiving the comparison signals from the respective unitary circuits so as to generate a general comparison signal indicating whether or not one of the two numbers is larger than the other number.

16. A circuit claimed in claim 14 wherein the control gate means includes a transfer gate connected between the carry input and the carry output, and each of the unitary circuits further includes comparison means connected to receive the carry input and at least one of the binary inputs so as to control the transfer gate and so as to generate the unitary shift signal in accordance with a logical relation between the carry input and the at least one binary input.

17. A circuit claimed in claim 16 wherein the comparison means includes an NAND gate having a first input connected to the carry input and a second input connected to receive the at least one binary input, an output of the NAND gate being connected to a control input of the transfer gate.

18. A circuit claimed in claim 17 wherein the second input of the NAND gate is directly connected to the at least one binary input.

19. A circuit claimed in claim 17 wherein each unitary circuit includes an OR gate having two inputs connected to the pair of binary inputs, respectively, and the second input of the NAND gate is connected to an output of the OR gate.

20. A circuit claimed in claim 17 wherein the comparison means also includes an inverter connected at its input to the output of the NAND gate and at its output to the unitary shift signal output.

21. A circuit claimed in claim 20 further including a switching transistor connected between the carry output and ground and controlled by the output of the inverter.

22. A circuit claimed in claim 17 wherein each of the unitary circuit further includes a second comparison means connected to receive one of the two binary inputs and a signal introduced from the carry input so as to generate a comparison output indicating which of the two binary input is larger.

23. A circuit claimed in claim 17 wherein each of the unitary circuits further includes a NOR gate having a first input connected to any one of the two binary inputs and a second input connected to the output of the first comparison means, the NOR gate generating a comparison output indicating which of the two binary inputs is larger.

24. A circuit claimed in claim 22 wherein the second comparison means includes an AND gate having a first input connected to any one of the two binary inputs and second input connected directly to the carry input, the AND gate generating the comparison output from its output terminal.

25. A circuit claimed in claim 14 wherein the carry input of the first most significant digit unitary circuit is connected to receive a predetermined carry signal and the carry output of the first most significant digit unitary circuit is connected to the carry input of the second most significant digit unitary circuit, and wherein the carry output of the second least significant digit unitary circuit is connected to the carry input of the first least significant digit unitary circuit.

26. A circuit claimed in claim 14 wherein each of the unitary circuits has a first means coupled to the carry input and at least one pair of binary inputs of the unitary circuit for generating a control signal when the carry input and the at least one binary input assume predetermine logic levels, respectively, a second means responding to the control signal so as to turn off the controlled gate means so that the carry input is separated from the carry output, and a third means responding to the control signal so as to generate the unitary shift signal to the unitary shift signal to output of the unitary circuit.

* * * * *

UNITED STATES PATENT AND TRADEMARK OFFICE
CERTIFICATE OF CORRECTION

PATENT NO. : 4,794,557

DATED : December 27, 1988

INVENTOR(S) : MAKOTO YOSHIDA ET AL, Tokyo Japan

It is certified that error appears in the above-identified patent and that said Letters Patent is hereby corrected as shown below:

Column 3, line 27, delete caircuit" and insert --circuit--.

Column 4, line 18, delete "differont" and insert --different--.

Column 5, line 55, delete "A>D" and insert --A>B--.

Signed and Sealed this

Twentieth Day of June, 1989

Attest:

DONALD J. QUIGG

Attesting Officer

Commissioner of Patents and Trademarks